(12) United States Patent
Iwanaga

(10) Patent No.: US 9,244,645 B2
(45) Date of Patent: Jan. 26, 2016

(54) PRINTER THAT CAN PERFORM WIRELESS COMMUNICATION WELL REGARDLESS OF THE ENVIRONMENT IN WHICH SAID PRINTER IS SET UP

(71) Applicant: NEC PLATFORMS, LTD., Kanagawa (JP)

(72) Inventor: Yuji Iwanaga, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/399,274

(22) PCT Filed: Apr. 26, 2013

(86) PCT No.: PCT/JP2013/062876
§ 371 (c)(1),
(2) Date: Nov. 6, 2014

(87) PCT Pub. No.: WO2013/175957
PCT Pub. Date: Nov. 28, 2013

(65) Prior Publication Data
US 2015/0070723 A1    Mar. 12, 2015

(30) Foreign Application Priority Data

May 24, 2012    (JP) ................................. 2012-118581

(51) Int. Cl.
| | |
|---|---|
| G06F 15/00 | (2006.01) |
| G06F 3/12 | (2006.01) |
| B41J 29/02 | (2006.01) |
| B41J 29/13 | (2006.01) |
| B41J 29/393 | (2006.01) |
| B41J 29/00 | (2006.01) |

(52) U.S. Cl.
CPC ............... *G06F 3/1292* (2013.01); *B41J 29/00* (2013.01); *B41J 29/02* (2013.01); *B41J 29/13* (2013.01); *B41J 29/393* (2013.01); *G06F 3/1285* (2013.01)

(58) Field of Classification Search
CPC ............................ B41J 29/393; G06F 3/1292
USPC .......................................................... 358/1.15
See application file for complete search history.

(56) References Cited

U.S. PATENT DOCUMENTS

2002/0044164 A1*  4/2002  Kaburagi ............... B41J 29/393
                                                                     347/2

FOREIGN PATENT DOCUMENTS

| | | |
|---|---|---|
| CN | 102407675 A | 4/2012 |
| JP | 11-305342 A | 11/1999 |
| JP | 2000-43367 A | 2/2000 |
| JP | 2002-103734 A | 4/2002 |
| JP | 2003-69765 A | 3/2003 |

(Continued)

OTHER PUBLICATIONS

Japanese Office Action for JP 2014-000965 dated May 21, 2014.

(Continued)

*Primary Examiner* — Saeid Ebrahimi Dehkordy
(74) *Attorney, Agent, or Firm* — Sughrue Mion, PLLC

(57) ABSTRACT

This printer is a printer having a wireless communication function, and includes an antenna (321f) in a front surface (110f) of a casing (110), which is a surface having a space requiring portion where space is required in a vicinity of the casing (110). The space requiring portion is a sheet delivery slot (120f) and a sheet receiving portion cover (130f) for replacing sheets.

4 Claims, 7 Drawing Sheets

(56) References Cited

FOREIGN PATENT DOCUMENTS

| | | |
|---|---|---|
| JP | 2004-223830 A | 8/2004 |
| JP | 2004-282189 A | 10/2004 |
| JP | 2005-15109 A | 1/2005 |
| JP | 2005-96433 A | 4/2005 |
| JP | 2007-74346 A | 3/2007 |
| JP | 2007-76068 A | 3/2007 |
| JP | 2008-168590 A | 7/2008 |
| JP | 2008-259028 A | 10/2008 |
| JP | 2009-157711 A | 7/2009 |
| JP | 2010-616 A | 1/2010 |
| JP | 2010-173151 A | 8/2010 |
| JP | 2011-62861 A | 3/2011 |
| JP | 2011-235966 A | 11/2011 |
| JP | 2012-91890 A | 5/2012 |

OTHER PUBLICATIONS

International Search Report for PCT/JP2013/062876 dated Jun. 4, 2013.

Communication dated Mar. 27, 2015 from the State Intellectual Property Office of People's Republic of China in counterpart Application No. 201380025317.4.

* cited by examiner

PRINTER THAT CAN PERFORM WIRELESS COMMUNICATION WELL REGARDLESS OF THE ENVIRONMENT IN WHICH SAID PRINTER IS SET UP

CROSS REFERENCE TO RELATED APPLICATIONS

This application is a National Stage of International Application No. PCT/JP2013/062876 filed Apr. 26, 2013, claiming priority based on Japanese Patent Application No. 2012-118581 filed May 24, 2012, the contents of all of which are incorporated herein by reference in their entirety.

TECHNICAL FIELD

This invention relates to a printer having a wireless communication function for communicating data that includes at least print data which is data of text, images, or the like to be printed.

BACKGROUND ART

Printers that have a wireless communication function are disclosed in, for example, Patent Documents 1 and 2.

In Patent Document 1, there is disclosed a printer in which an antenna is mounted to a place that allows the antenna to rotate with the rotation of a cover on the top surface of the printer main body, and, when in use, the antenna is rotated with the rotation of the cover to an erect position with respect to a plane on which the printer main body is set up, whereas the antenna is pressed by the cover and housed in a receiving space formed in the cover when not in use.

In Patent Document 2, there is disclosed a printer in which a plurality of connectors having the same shape and connected to an input/output circuit of the printer are provided at difference places in a printer housing, and a slot module for a card-type wireless module with a built-in antenna is selectively connected to one of the plurality of connectors.

PRIOR ART DOCUMENTS

Patent Document

Patent Document 1: JP-A-2008-168590
Patent Document 2: JP-A-2011-062861

SUMMARY OF THE INVENTION

Problem to be Solved by the Invention

Printers in general, including printers that have a wireless communication function such as those disclosed in Patent Documents 1 and 2, are set up in a location convenient to a person or an organization that is installing the printer, and it is impossible to identify in what location a printer is going to be set up. In the case of a printer that has a wireless communication function, the set-up location may have an obstacle to wireless communication, such as another device or a wall, around an antenna which is provided in the printer to transmit and receive radio waves.

When a surface of the printer on which the antenna is mounted is blocked by an obstacle, communication retries and communication errors happen frequently, causing problems such as a delayed start to printing due to the prolonged time required for at least data reception out of the transmission and reception of print data.

This problem is prominent particularly in the case of a kitchen printer, which outputs a customer's order to the kitchen in an order entry system, where obstacles to wireless communication are often put on top of, beside, or at the rear of the kitchen printer because of the general lack of spare space in kitchens. Accordingly, a printer that is capable of solid wireless communication in any environment in which the printer is set up is waited to be available on the market.

It is therefore an object of this invention to provide a printer having a wireless communication function that is capable of solid wireless communication in any environment in which the printer is set up.

Means to Solve the Problem

According to one embodiment of this invention, there is provided a printer having a wireless communication function, including an antenna, which is provided in a surface that has a space requiring portion where space is required in a vicinity of a casing.

The space requiring portion may be a sheet replacing part. Alternatively, the space requiring portion may be a sheet delivery slot. Still alternatively, the space requiring portion may be a sheet replacing part and a sheet delivery slot that are formed in the same surface as each other. Still further alternatively, the space requiring portion may be an air inlet/outlet or heat sink for cooling a portion of the printer that generates heat.

The antenna may be built in the casing. Alternatively, the antenna may be mounted to a surface of the casing. Further, the antenna may include a plurality of antenna elements.

Effect of the Invention

The printer according to one embodiment of this invention is capable of solid wireless communication in any environment in which the printer is set up.

BEST MODES FOR CARRYING OUT THE INVENTION

A printer according to this invention has a wireless communication function.

This printer particularly has an antenna on a surface provided with a space requiring portion, where space is required in the vicinity of a casing.

The structure described above enables this printer to hold solid wireless communication in any environment in which the printer is set up.

Now, printers according to concrete embodiments of this invention are described with reference to the drawings.

First Embodiment

A printer according to a first embodiment of this invention is a kitchen printer for outputting a customer's order to a kitchen in an order entry system at a family restaurant, a pub, a fast food place, or the like. This printer has a wireless communication function for communicating data that includes at least print data which is data of text, images, or the like to be printed.

Figure 1:
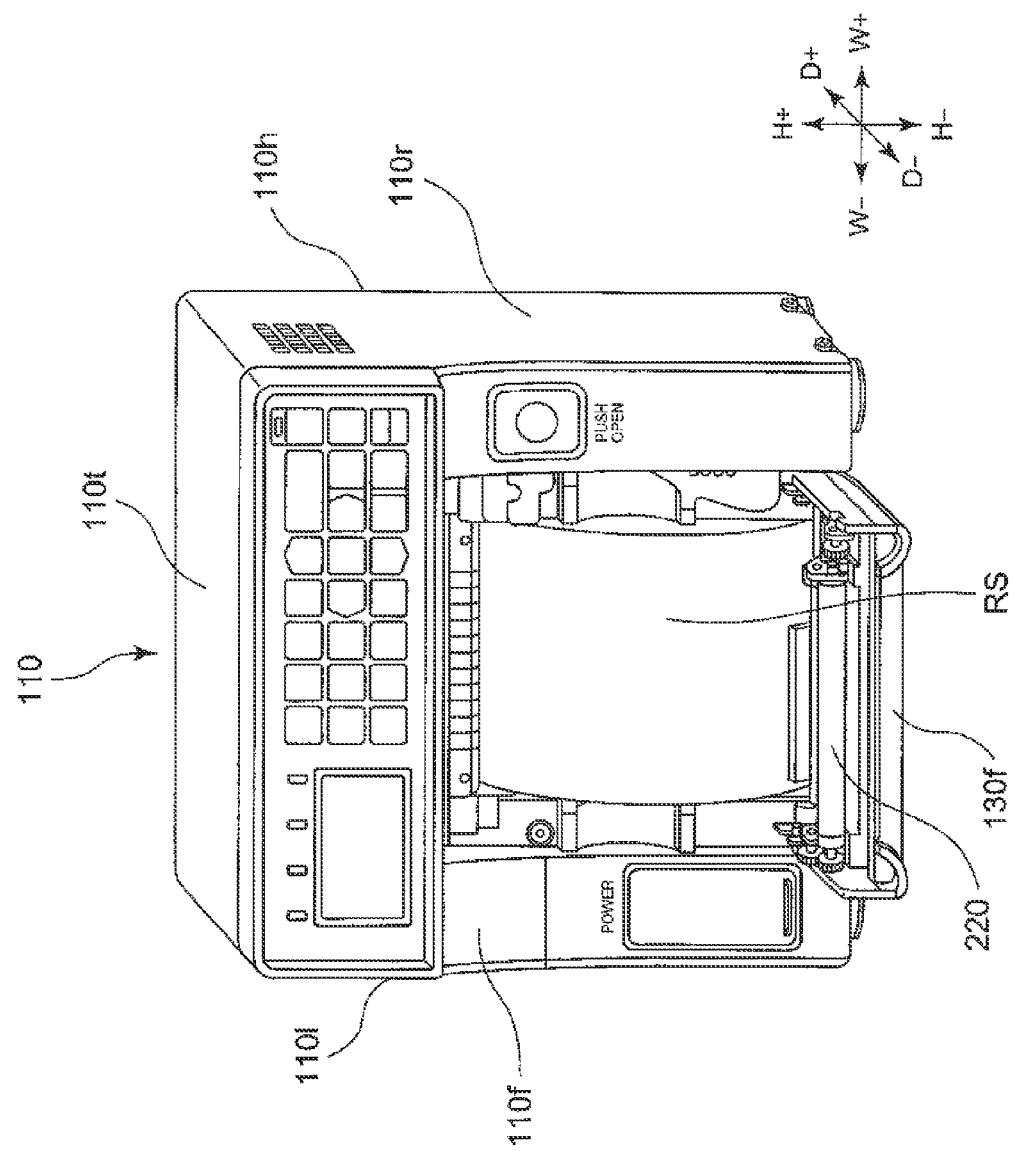
FIG. 1 is a perspective view illustrating a printer according to a first embodiment of this invention.
Figure 2:
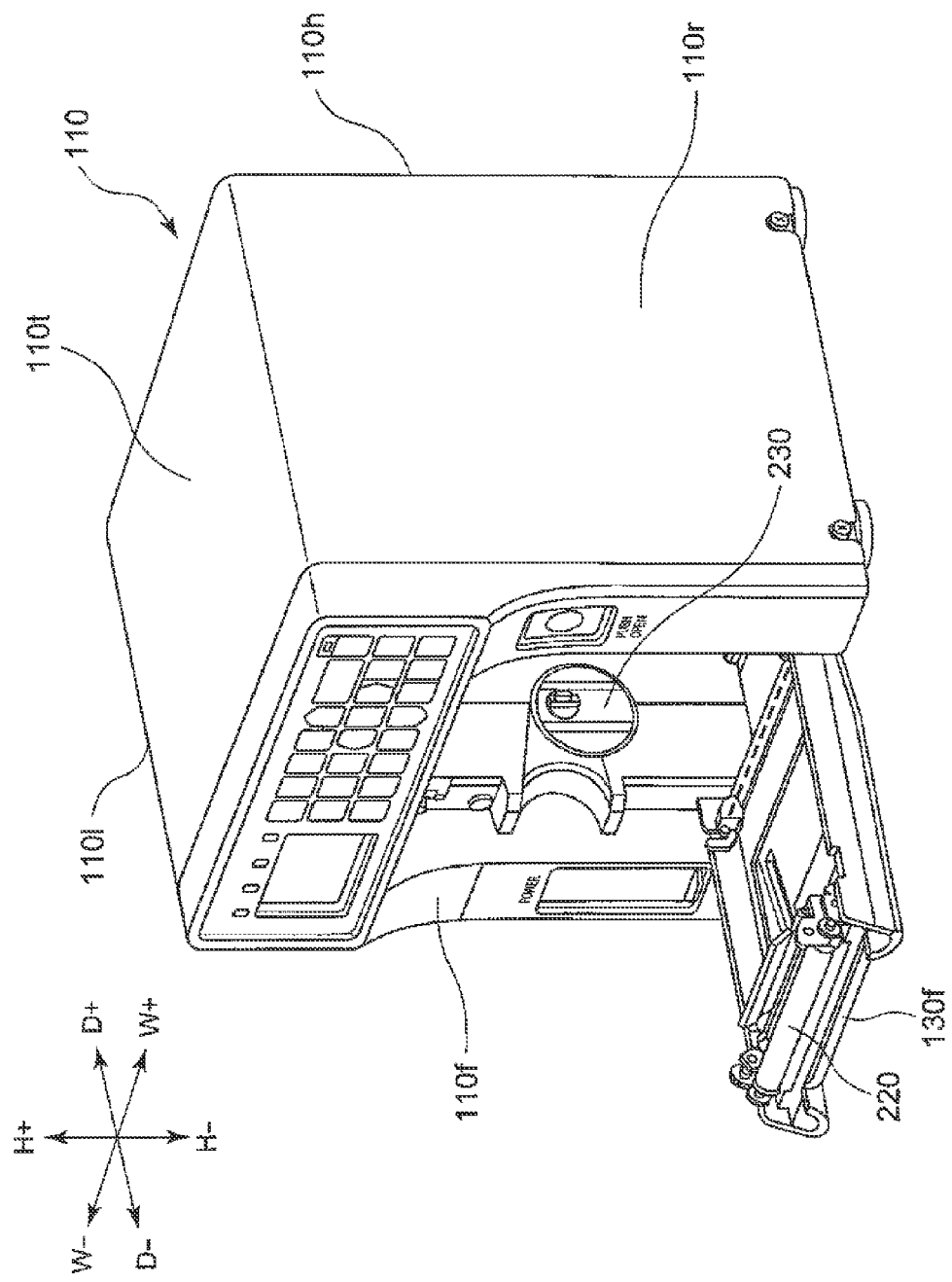
FIG. 2 is a perspective view illustrating the printer according to the first embodiment of this invention.

Referring to FIGS. 1 and 2, this printer includes a substantially rectangular parallelepiped casing 110, which has a front surface 110*f*, a rear surface 110*h*, a top surface 110*t*, a left side surface 110*l*, and a right side surface 110*r*, a wireless module for holding wireless communication, which is described later, and an antenna.

The front surface 110*f* of the casing 110 is provided with a sheet receiving portion cover 130*f*, which opens and closes toward a depth direction D− when a rolled sheet RS in a receiving portion inside the casing 110 is replaced. FIG. 1 illustrates a state in which the sheet receiving portion cover 130*f* is open and the rolled sheet RS is set. FIG. 2 illustrates a state in which the sheet receiving portion cover 130*f* is open and the rolled sheet RS is not set. The sheet receiving portion cover 130*f* is provided with a platen 220. The receiving portion for the rolled sheet RS is provided with a setting axis 230, which supports the cylindrical rolled sheet RS rotatably about an axis. The structure for replacing the rolled sheet RS may be designed so that the rolled sheet RS is pulled out in the depth direction D− along with a printing part.

The front surface 110*f* of the casing 110 is further provided with a sheet delivery slot 120*f* through which the rolled sheet RS that has been printed on is delivered toward the depth direction D−.

Figure 3:
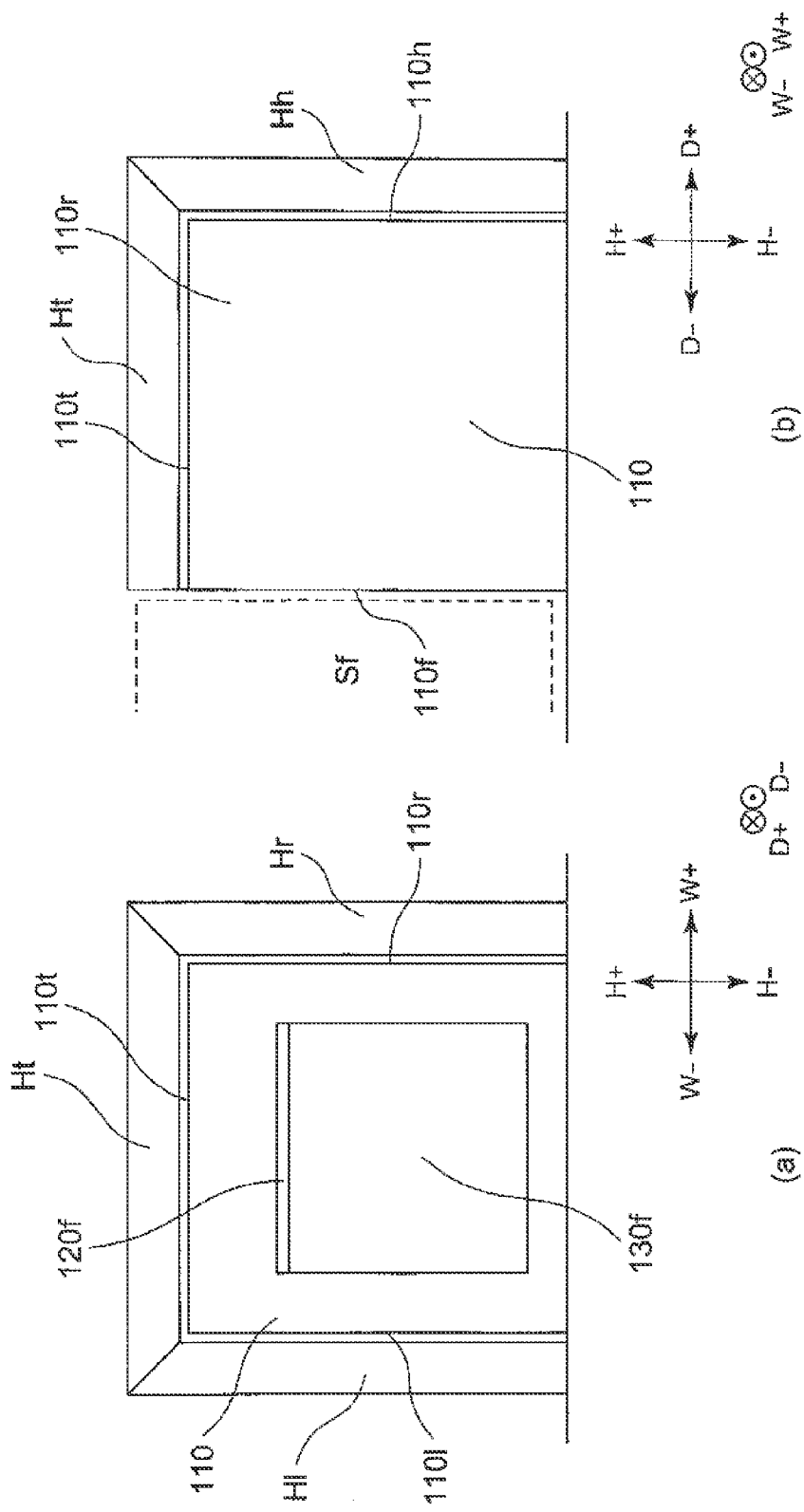
FIG. 3 shows diagrams illustrating a state in which the printer according to the first embodiment of this invention is set up, in which (a) is a frontal view and (b) is a sectional view.

The assumption here is that this printer is set up in a kitchen. Referring to FIGS. 3(*a*) and 3(*b*), the casing 110 of this printer is blocked by a left obstacle Hl at the left side surface 110*l*, by an upper obstacle Ht at the top surface 110*t*, by a right obstacle Hr at the right side surface 110*r*, and by a rear obstacle Hh at the rear surface 110*h*. If an antenna is provided on these surfaces, communication retries and communication errors happen frequently, which can cause a wireless communication failure such as a delayed start to printing due to the prolonged time required for data reception of print data.

When this printer is set up, the front surface 110*f* of the casing 110 which has the sheet receiving portion cover 130*f* and the sheet delivery slot 120*f* requires a front space Sf in the depth direction D−, which is the front side direction with respect to the front surface 110*f* To put it the other way around, the sheet replacing part and the sheet delivery slot are a space requiring portion where the front space Sf is required in the vicinity of the casing 110. In short, the front surface 110*f* which is a surface of the casing 110 that has the space requiring portion is not blocked by an obstacle.

Figure 4:
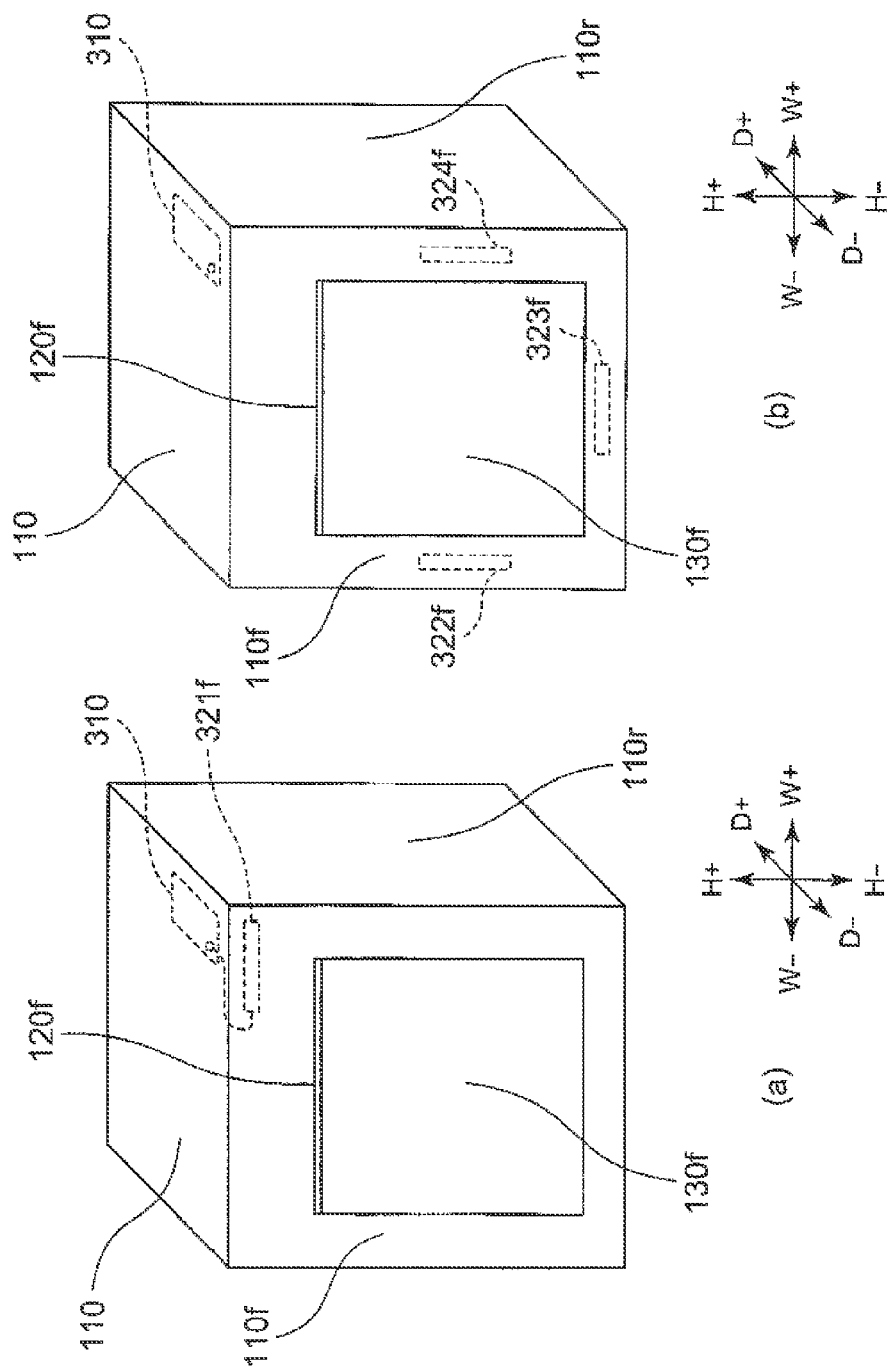
FIG. 4 shows diagrams illustrating the printer according to the first embodiment of this invention, in which (a) is a perspective view and (b) is a perspective view that illustrates a modification example.

Referring to FIG. 4(*a*), this printer has a wireless module 310 for holding wireless communication, and an antenna 321*f*, which is connected to the wireless module by a cable. The antenna 321*f* is mounted on the inside of the front surface 110*f*, which is not blocked by an obstacle. This ensures solid wireless communication in any environment in which the printer is set up.

In this printer, the position of the antenna is not limited to the one illustrated in FIG. 4(*a*). For example, as illustrated in FIG. 4(*b*), the antenna may be one of antennas 322*f*, 323*f*, and 324*f*. Alternatively, diversity switching may be made between the plurality of antennas 322*f*, 323*f*, and 324*f*.

The antenna in this printer may also be mounted outside the casing rotatably so that a user can direct the antenna at an arbitrary angle.

The space requiring portion in this printer may also be an air inlet/outlet or heat sink for cooling a portion of the printer that generates heat.

Second Embodiment

A second embodiment of this invention differs from the first embodiment in that one of space requiring portions is on one of the side surfaces of the casing, instead of the front surface of the casing.

A printer according to the second embodiment of this invention is a kitchen printer for outputting a customer's order to a kitchen in an order entry system. This printer has a wireless communication function.

Figure 5:
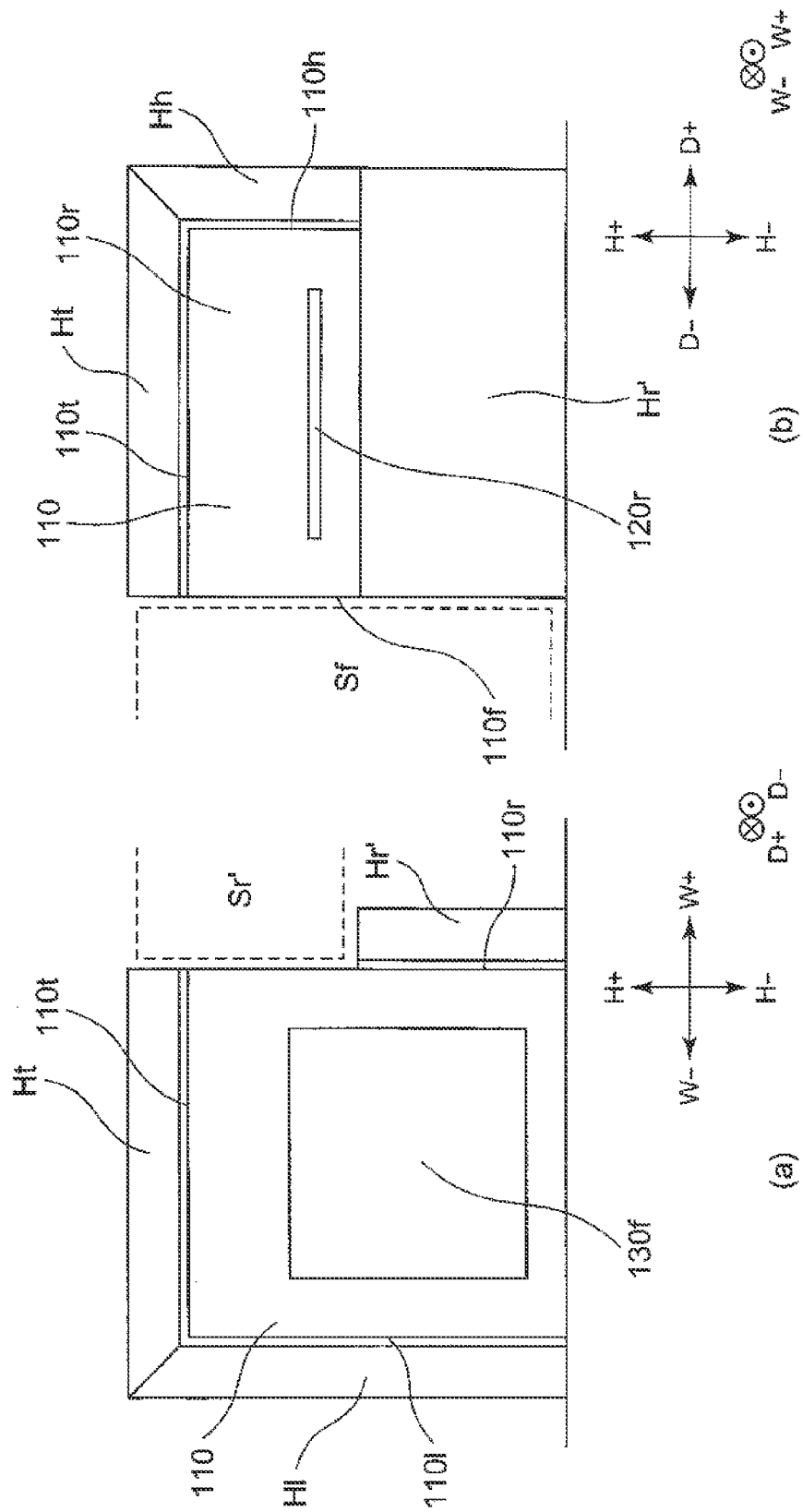
FIG. 5 shows diagrams illustrating a state in which a printer according to a second embodiment of this invention is set up, in which (a) is a frontal view and (b) is a side view.

Referring to FIGS. 5(*a*) and 5(*b*), this printer includes a substantially rectangular parallelepiped casing 110, which has a front surface 110*f*, a rear surface 110*h*, a top surface 110*t*, a left side surface 110*l*, and a right side surface 110*r*, a wireless module for holding wireless communication, which is described later, and an antenna.

The front surface 110*f* of the casing 110 is provided with a sheet receiving portion cover 130*f*, which opens and closes toward a depth direction D− when a rolled sheet in a receiving portion inside the casing 110 is replaced. The structure for replacing the rolled sheet may be designed so that the rolled sheet is pulled out in the depth direction D− along with a printing part.

The right side surface 110*r* of the casing 110 is, on the other hand, further provided with a sheet delivery slot 120*r* through which the rolled sheet RS that has been printed on is delivered toward a width direction W+.

The assumption here is that this printer is set up in a kitchen. As illustrated in FIGS. 5(*a*) and 5(*b*), the casing 110 of this printer is blocked by a left obstacle Hl at the left side surface 110*l*, by an upper obstacle Ht at the top surface 110*t*, and by a rear obstacle Hh at the rear surface 110*h*. If an antenna is provided on these surfaces, communication retries and communication errors happen frequently, which can cause a wireless communication failure such as a delayed start to printing due to the prolonged time required for data reception of print data. The right side surface 110*r* of the casing 110 is blocked by a right obstacle Hr' only in its lower area.

When this printer is set up, the front surface 110*f* of the casing 110 which has the sheet receiving portion cover 130*f* requires a front space Sf in the depth direction D−, which is the front side direction with respect to the front surface 110*f* To put it the other way around, the sheet replacing part is a space requiring portion where the front space Sf is required in the vicinity of the casing 110. In short, the front surface 110*f* which is a surface of the casing 110 that has the space requiring portion is not blocked by an obstacle.

The right side surface 110*r* which has the sheet delivery slot 120*r*, on the other hand, requires a right space Sr' in the width direction W+, which is the right side direction with respect to the right side surface 110*r*. To put it the other way around, the sheet delivery slot is a space requiring portion, where the right space Sr' is required in the vicinity of the casing 110. In short, the right surface 110r which is a surface of the casing 110 that has the space requiring portion is not blocked by an obstacle.

Figure 6:
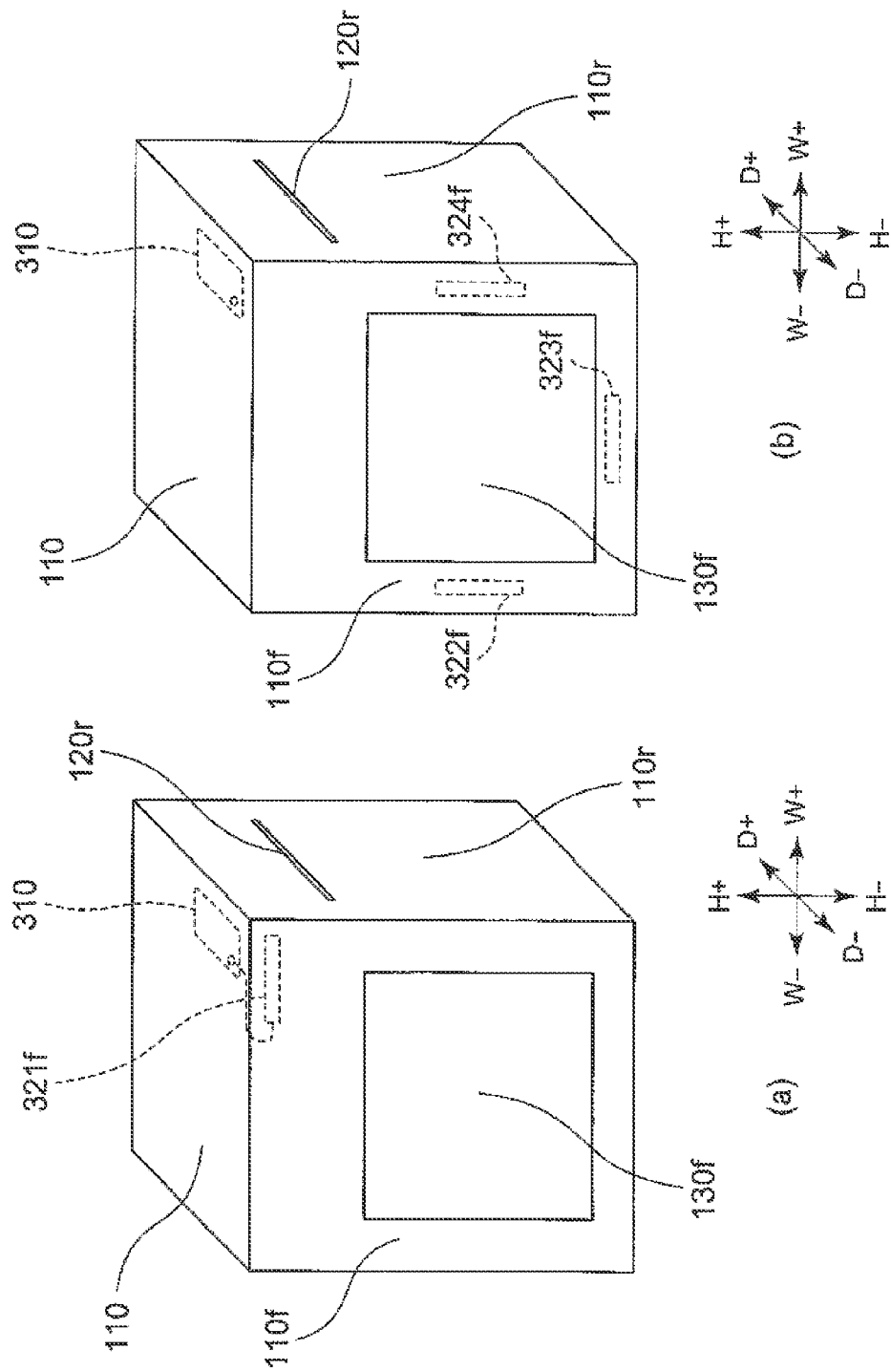
FIG. 6 shows diagrams illustrating the printer according to the second embodiment of this invention, in which (a) is a perspective view and (b) is a perspective view that illustrates a modification example.

Referring to FIG. 6(*a*), this printer has a wireless module 310 for holding wireless communication, and an antenna 321f, which is connected to the wireless module by a cable.

The antenna 321f is mounted on the inside of the front surface 110f, which is not blocked by an obstacle. This ensures solid wireless communication in any environment in which the printer is set up.

In this printer, the position of the antenna is not limited to the one illustrated in FIG. 6(*a*).

For example, as illustrated in FIG. 6(*b*), the antenna may be one of antennas 322f, 323f, and 324f. Alternatively, diversity switching may be made between the plurality of antennas 322f, 323f, and 324f.

Figure 7:
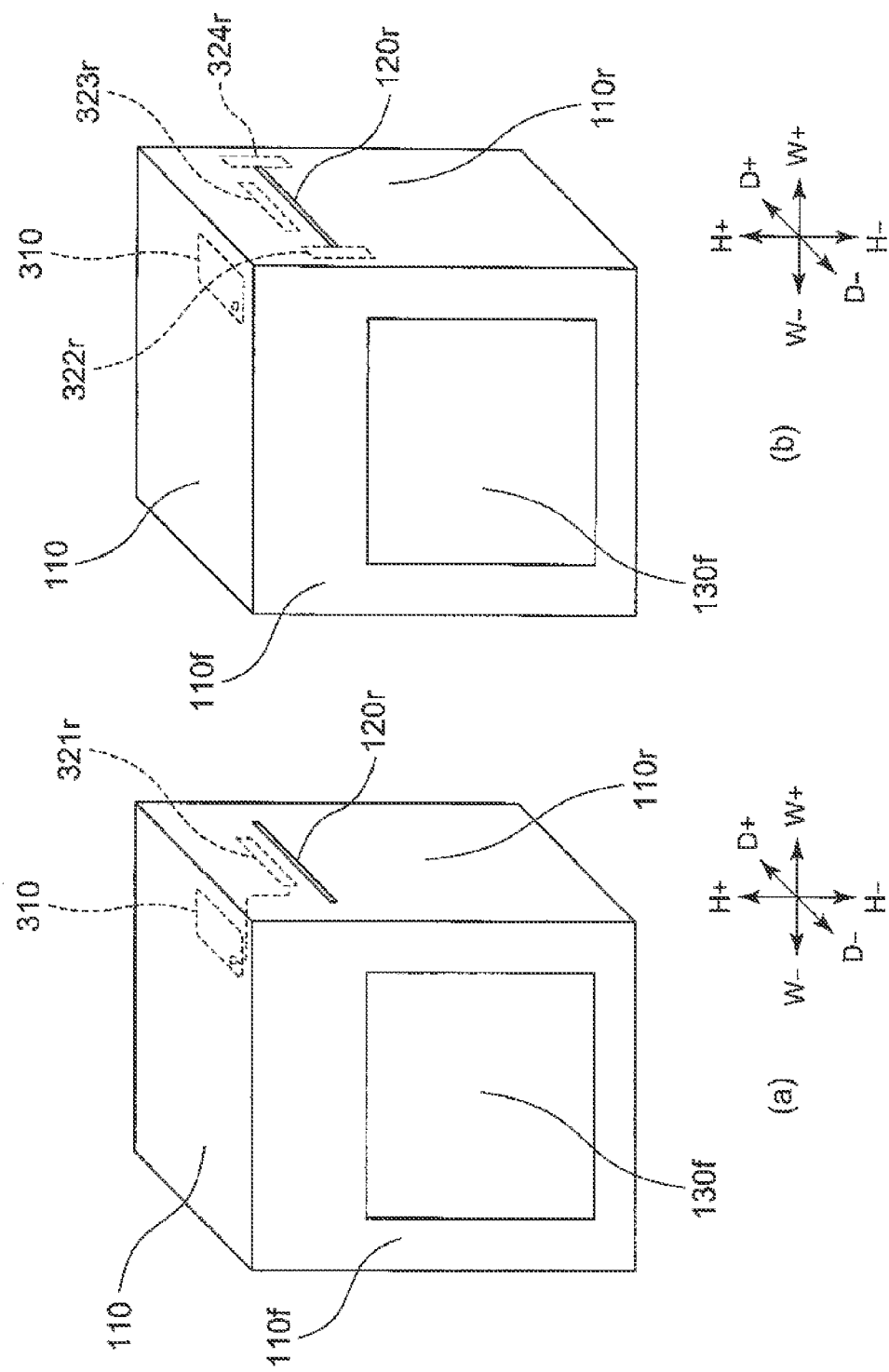
FIG. 7 shows diagrams illustrating the printer according to the second embodiment of this invention, in which (a) is a perspective view that illustrates another modification example and (b) is a perspective view that illustrates still another modification example.

As illustrated in FIG. 7(*a*), the antenna may also be an antenna 321r mounted on the inside of the right side surface 110r, which is not blocked by an obstacle.

Alternatively, as illustrated in FIG. 7(*b*), the antenna may be one of antennas 322r, 323r, and 324r. Still alternatively, diversity switching may be made between the plurality of antennas 322r, 323r, and 324r.

The antenna in this printer may also be mounted outside the casing rotatably so that a user can direct the antenna at an arbitrary angle.

The space requiring portion in this printer may also be an air inlet/outlet or heat sink for cooling a portion of the printer that generates heat.

INDUSTRIAL APPLICABILITY

While this invention has been described with reference to the embodiments, various modifications that a person skilled in the art can understand may be made to the configuration and details of this invention.

Further, this application is based on and claims the benefit of priority from Japanese Patent Application No. 2012-118581, filed on May 24, 2012, the disclosure of which is incorporated herein by reference in its entirety.

The invention claimed is:

1. A printer having a wireless communication function, which is installed and used,
   wherein the printer comprises:
   a casing substantially rectangular parallelepiped,
   a sheet receiving portion, provided in the casing, receiving a rolled sheet;
   a sheet receiving portion cover, provided at a front surface of the casing, and capable of opening to allow that the rolled sheet is received in the sheet receiving portion through the front surface;
   a sheet delivery slot, provided at the front surface of the casing, delivering a printed sheet through the front surface; and
   an antenna for transmitting and receiving radio waves,
   wherein the sheet receiving portion cover can open within a range of orthogonal projection of the front surface of the casing,
   wherein the sheet delivery slot delivers the printed sheet within the range of orthogonal projection of the front surface of the casing, and
   wherein the antenna is provided at only an inside of a region, except the sheet receiving portion cover and the sheet delivery slot, in the front surface of the casing.

2. A printer according to claim 1, wherein the antenna comprises a plurality of antenna elements.

3. A printer according to claim 2, which is located in a kitchen room as a kitchen printer used in an order entry system.

4. A printer according to claim 1, which is located in a kitchen room as a kitchen printer used in an order entry system.

* * * * *